(12) United States Patent
Drolet et al.

(10) Patent No.: US 9,671,660 B2
(45) Date of Patent: Jun. 6, 2017

(54) DISPLAY WITH LOW REFLECTION ELECTROSTATIC SHIELDING

(75) Inventors: Jean-Jacques Drolet, San Jose, CA (US); Mingxia Gu, San Jose, CA (US); Wei Chen, Palo Alto, CA (US); Yi Huang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 769 days.

(21) Appl. No.: 13/619,866

(22) Filed: Sep. 14, 2012

(65) Prior Publication Data

US 2014/0078447 A1    Mar. 20, 2014

(51) Int. Cl.
*G02F 1/1335*   (2006.01)
*G02F 1/1362*   (2006.01)

(52) U.S. Cl.
CPC .. *G02F 1/136204* (2013.01); *G02F 1/133502* (2013.01)

(58) Field of Classification Search
CPC ............. G02F 1/1335; G02F 1/136204; G02F 1/133502
USPC ............................................ 349/96, 137, 116
See application file for complete search history.

(56) References Cited

U.S. PATENT DOCUMENTS

| | | | |
|---|---|---|---|
| 6,503,581 B1 | 1/2003 | Shibue et al. | |
| 7,413,766 B2* | 8/2008 | Satake et al. | 427/162 |
| 7,713,613 B2* | 5/2010 | Shinohara | 428/220 |
| 7,768,608 B2 | 8/2010 | Ichihashi et al. | |
| 8,246,412 B2 | 8/2012 | Tomono | |
| 2004/0209007 A1* | 10/2004 | Satake | B32B 27/08 428/1.3 |
| 2005/0073640 A1 | 4/2005 | Dunn et al. | |
| 2006/0182945 A1* | 8/2006 | Yoneyama | B32B 17/10018 428/304.4 |
| 2007/0146887 A1 | 6/2007 | Ikeda et al. | |
| 2007/0231561 A1* | 10/2007 | Pellerite | B32B 27/08 428/323 |
| 2008/0014373 A1* | 1/2008 | Muramatsu | C08L 1/12 428/1.1 |
| 2008/0100780 A1* | 5/2008 | Suzuki et al. | 349/96 |
| 2009/0029129 A1 | 1/2009 | Pellerite et al. | |

(Continued)

FOREIGN PATENT DOCUMENTS

| | | |
|---|---|---|
| CN | 1661394 | 8/2005 |
| CN | 102023419 | 4/2011 |

(Continued)

*Primary Examiner* — Charles Chang
(74) *Attorney, Agent, or Firm* — Treyz Law Group, P.C.; G. Victor Treyz; Zachary D. Hadd

(57) ABSTRACT

An electronic device may be provided with a display such as a liquid crystal display. The display may have a layer of liquid crystal material interposed between upper and lower polarizers. A first substrate such as a thin-film transistor layer may be interposed between the liquid crystal layer and the lower polarizer. A second substrate such as a color filter glass layer may be interposed between the upper polarizer and the liquid crystal layer. The color filter glass layer may have opposing upper and lower surfaces. The lower surface of the color filter glass layer may have an array of color filter elements. To prevent damage to display, an electrostatic shielding layer may be formed on the upper surface of the color filter glass layer under the upper polarizer. Reflections may be minimized by using index-matching dielectric layers in the display or thinning the shielding layer.

9 Claims, 6 Drawing Sheets

(56) References Cited

U.S. PATENT DOCUMENTS

| | | | |
|---|---|---|---|
| 2009/0103034 A1* | 4/2009 | Asada | G02F 1/1345 349/139 |
| 2009/0268143 A1* | 10/2009 | Takeuchi et al. | 349/130 |
| 2010/0254003 A1* | 10/2010 | Higashikawa | G02B 1/11 359/488.01 |
| 2010/0271570 A1* | 10/2010 | Dunn | 349/72 |
| 2011/0063548 A1* | 3/2011 | Yoshida et al. | 349/106 |
| 2011/0181813 A1* | 7/2011 | Kim | G02F 1/133528 349/96 |

FOREIGN PATENT DOCUMENTS

| | | |
|---|---|---|
| JP | 2009192797 | 8/2009 |
| TW | 522272 B | 3/2003 |

\* cited by examiner

DISPLAY WITH LOW REFLECTION ELECTROSTATIC SHIELDING

BACKGROUND

This relates generally to electronic devices, and more particularly, to electronic devices with displays.

Electronic devices often include displays. For example, cellular telephones and portable computers often include displays for presenting information to a user.

When touched by a user, a display may be exposed to electrostatic charge. Displays are often provided with electrostatic discharge shielding layers to prevent damage to display structures. An electrostatic shielding layer prevents electrostatic charge from imposing damaging electric fields on underlying display structures and thereby prevents damage to a display during electrostatic discharge events. Electrostatic shielding layers are formed from conductive materials to provide a low-resistance path through which electrostatic charge can be removed from display surfaces. Electrostatic shielding layers are also transparent to allow content on a display to be viewed by a user.

A commonly used material that is both transparent and conductive and that can therefore be used in forming an electrostatic discharge shielding layer is indium tin oxide. With one conventional arrangement, a layer of indium tin oxide of about 200-300 angstroms in thickness or more is formed between an upper surface of a display color filter glass layer and a lower surface of an upper polarizer. Indium tin oxide electrostatic shielding layers with this type of conventional configuration may be satisfactory for providing adequate shielding and display transparency, but can give rise to undesirable light reflections from a display. In the presence of excessive reflections, content on a display may appear washed out and difficult to view by a user.

It would therefore be desirable to be able to provide improved displays having low reflectivity surfaces with electrostatic discharge shielding.

SUMMARY

An electronic device may be provided with a display such as a liquid crystal display. The display may have a layer of liquid crystal material and upper and lower polarizers. A first substrate such as a thin-film transistor layer may be interposed between the liquid crystal layer and the lower polarizer. A second substrate such as a color filter glass layer may be interposed between the upper polarizer and the liquid crystal layer.

The color filter glass layer may have opposing upper and lower surfaces. An array of color filter elements may be formed on the lower surface of the color filter glass layer. To prevent damage to circuitry in the display and distortion of display images from electrostatic charge, an electrostatic shielding layer may be formed on the upper surface of the color filter glass substrate under the upper polarizer.

Display reflections may be minimized by reducing the thickness of the electrostatic shielding layer or by providing dielectric layers such as aluminum oxide layers above and below the electrostatic shielding layer.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
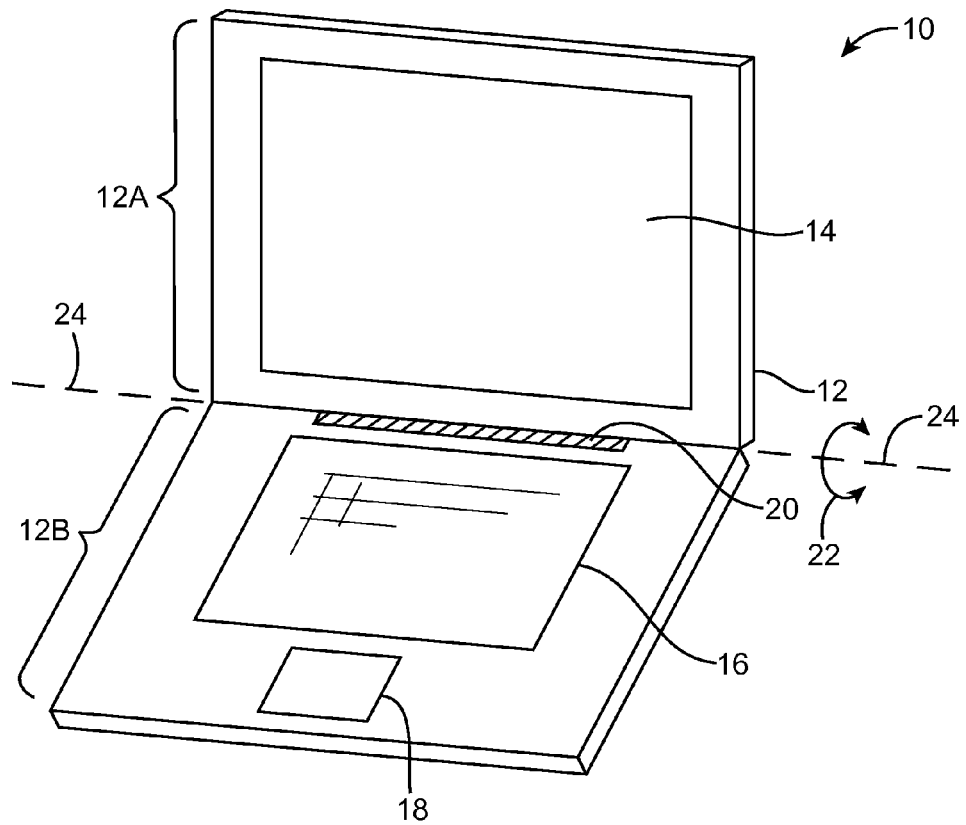
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
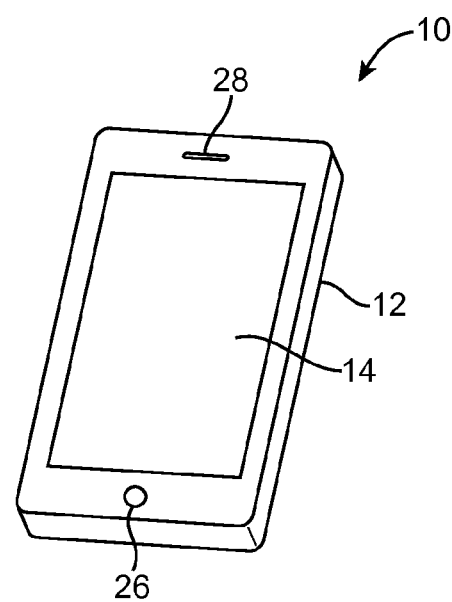
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
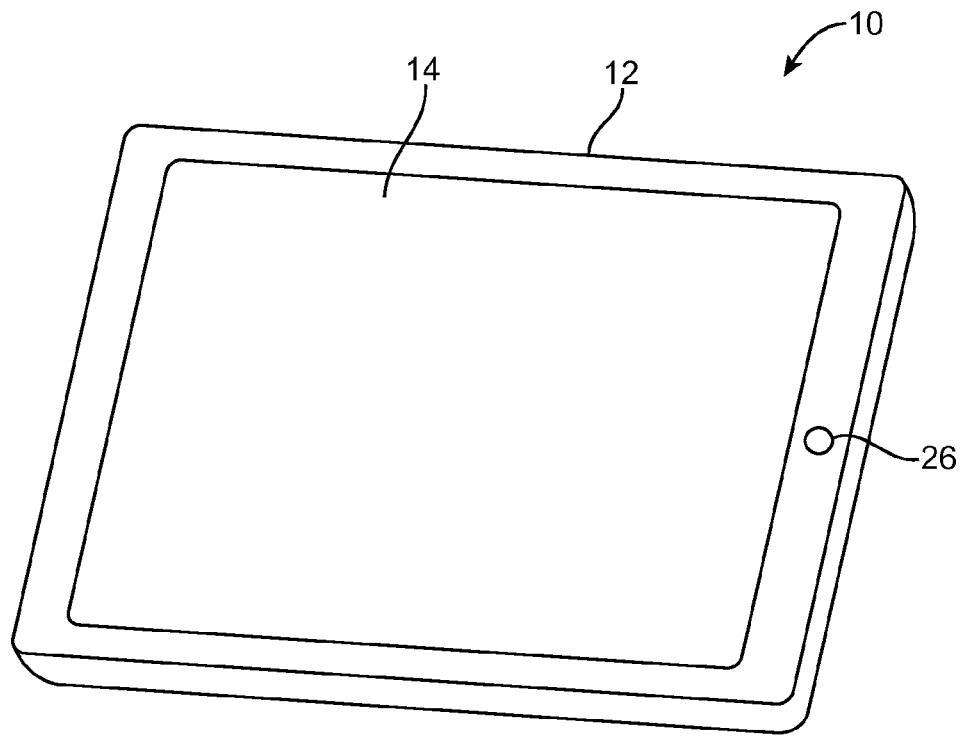
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
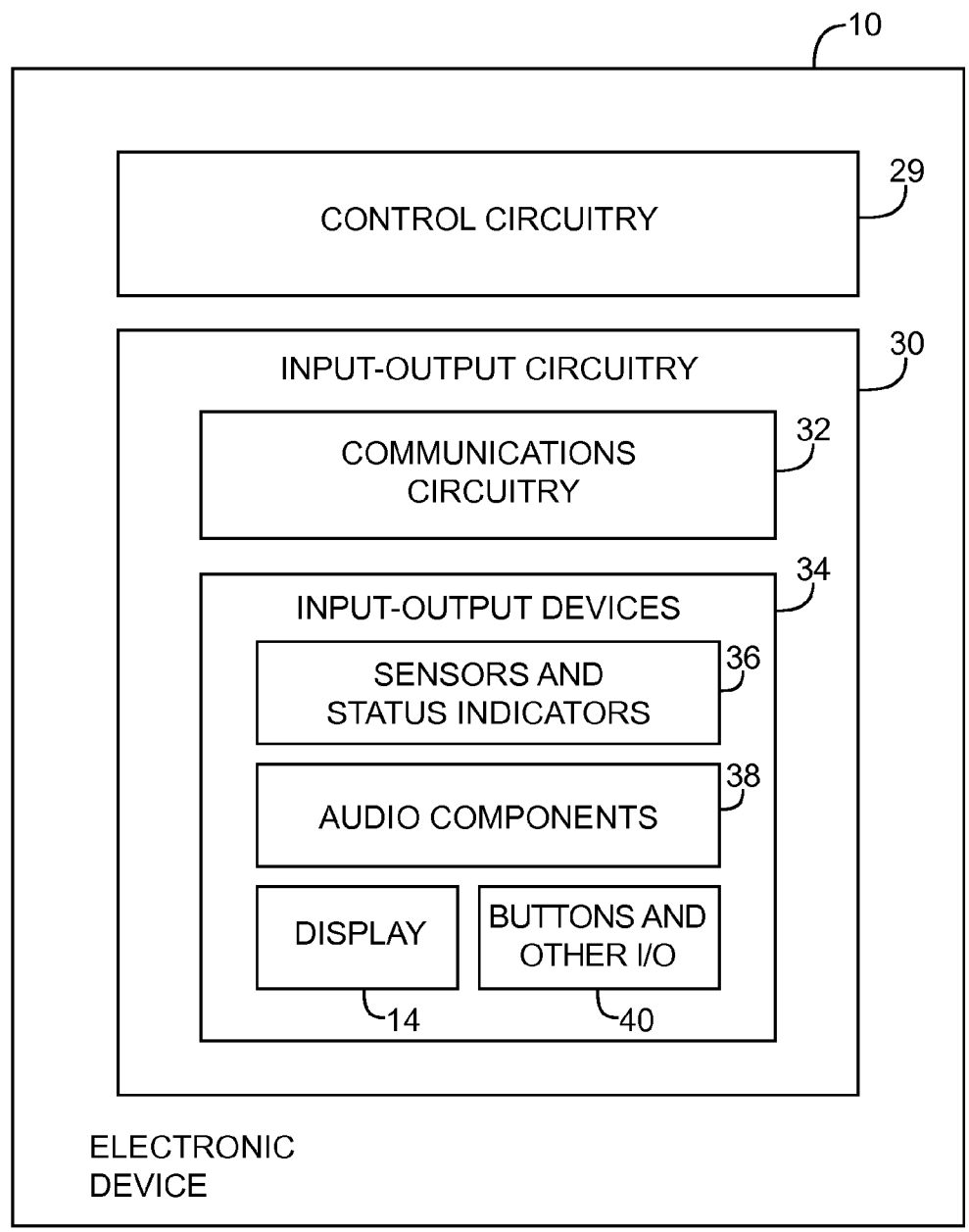
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
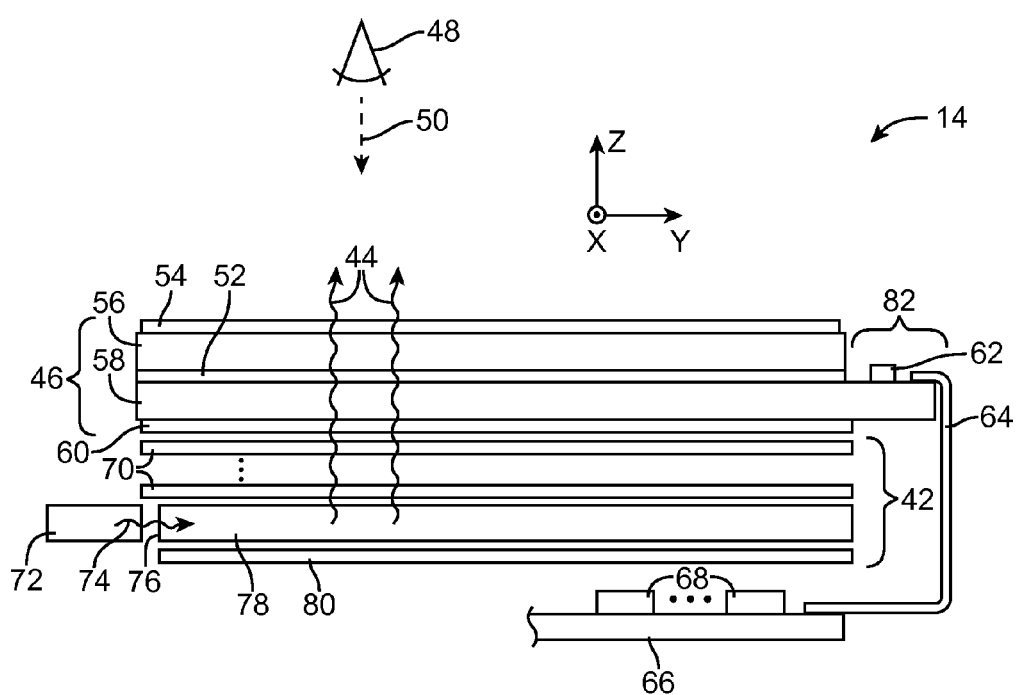
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter substrate layer on which an array of color filter elements may be formed to provide display 14 with the ability to display color images. The substrate material used in forming layer 56 may be a sheet of transparent material such as glass or plastic. Illustrative configurations in which substrate layer 56 is formed using a layer of glass are sometimes described herein as an example. Color filter elements on glass layer 56 may be formed from polymers colored with dyes or pigments (as examples).

During operation of display 14 in device 10, control circuitry 29 (e.g., one or more integrated circuits such as components 68 on printed circuit 66 of FIG. 5) may be used to generate information to be displayed on display (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 58. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
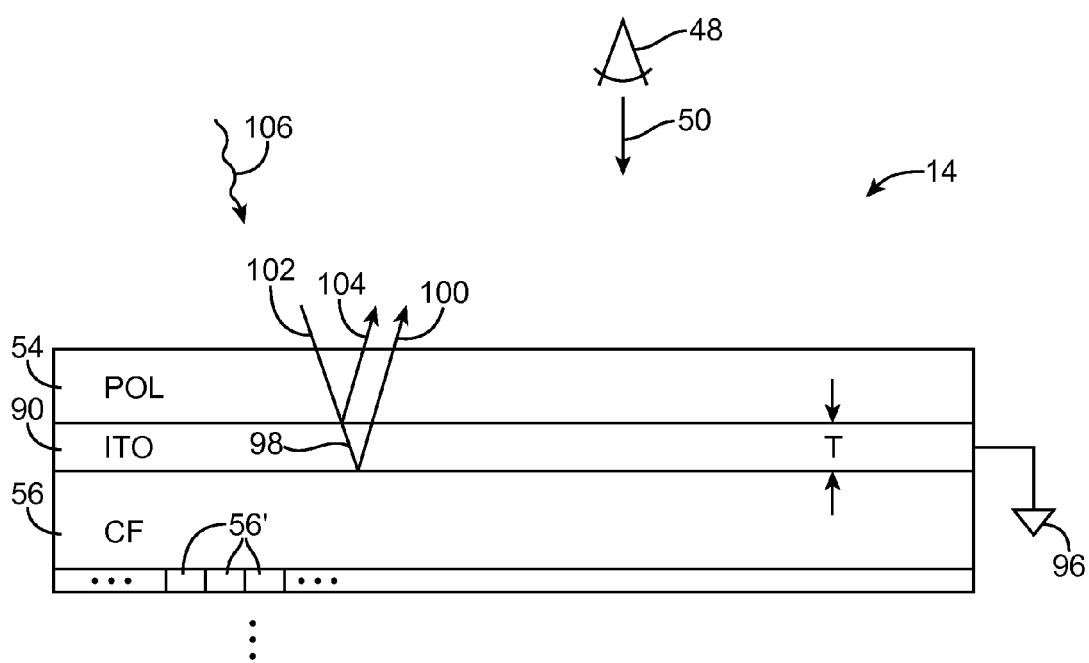
FIG. 6 is a cross-sectional side view of an illustrative display with a transparent conductive electrostatic discharge shielding layer configured to reduce surface reflections in accordance with an embodiment of the present invention.

To provide display 14 with the ability to withstand damage from electrostatic discharge events, display 14 may be provided with an electrostatic discharge shielding layer such as electrostatic discharge shielding layer 90 of FIG. 6. Layer 90 may be formed from a transparent conductive material such as indium tin oxide. A conductive path formed from metal traces, metal paint, conductive adhesive, wires, or other conductive materials may be used to electrically short layer 90 to ground 96 (e.g., layer 90 may be shorted to part of a metal housing such as housing 12 or to ground traces on a printed circuit board in housing 12). By grounding electrostatic discharge shielding layer 90 in this way, layer 90 may discharge any electrostatic charge that is deposited on display 14 due to contact with an external object such as a hand of a user. Sputtering, other types of physical vapor deposition, or other types of deposition techniques (e.g., chemical vapor deposition, electrochemical deposition, ink-jet patterning, pad printing, spinning, spraying, etc.) may be used in depositing electrostatic discharge shielding layer 90 on the layers of display 14.

Color filter glass layer 56 may be provided with a layer of color filter elements 56'. Color filter elements 56' may, for example, include red, blue, and green polymer color filter elements or other patterned colored structures for providing display 14 with the ability to display color images. As an example, color filter layer 56 may be provided with an array of color filter elements 56' that are each aligned with a corresponding display pixel in an array of display pixels on thin-film transistor layer 58. The circuitry of display 14 may be damaged when exposed to excessive electric fields of the type that may be produced when electrostatic charge builds up on the surface of display 14. When indium tin oxide layer 90 is included in display 14, however, indium tin oxide layer 90 will discharge any electrostatic charge that is deposited on the surface of display 14 to ground 96, thereby preventing damage to the circuitry within display 14 and distortion of images on display 14.

As shown in FIG. 6, indium tin oxide electrostatic discharge shielding layer 90 may be interposed between upper polarizer 54 and color filter glass layer 56. Layer 90 may, for example, be deposited on the upper surface of color filter glass 56 (e.g., using sputtering or other deposition techniques). Polarizer layer 54 may be attached to the upper surface of layer 90 using adhesive (as an example).

During operation of display 14, ambient light 106 may be directed towards the surface of display 14. A fraction of light 106 may reflect from display 14 and may be visible to a user such as viewer 48 who is viewing display 14 in direction 50. Excessive reflection by display 14 can degrade the performance of display 14 (e.g., by lowering contrast, by creating stray images on the display that interfere with the content that is being displayed on the display, etc.).

Reflections from display 14 may be at least partly the result of the presence of indium tin oxide layer 90. Polarizer layer 54 may have an index of refraction of about 1.5. Color filter layer 56 may have a glass substrate or other clear dielectric substrate with an index of refraction of about 1.5. Indium tin oxide layer 90 may, however, have an index of refraction that differs significantly from the indices of refraction of layers 54 and 56. Indium tin oxide layer 90 may, for example, have an index of refraction of 1.9.

Ambient light 106 may be reflected from display 14 due at least partly to index of refraction mismatch between indium tin oxide layer 90 and materials such as polarizer 54 and color filter glass 56. For example, ambient light rays such as light ray 102 may be reflected from the interface between polarizer layer 54 and indium tin oxide layer 90 to produce reflected light 104 and light rays such as light ray (i.e., the portion of ambient light ray 102 that has been transmitted through the interface between layers 54 and 90) may be reflected from the interface between indium tin oxide layer 90 and color filter glass 56 to produce reflected light 100.

The magnitude of light reflection from the interface between layers 54 and 90 and from the interface between layers 90 and 56 can be modeled using equation 1, where n1 represent the index of refraction of indium tin oxide layer 90 and n2 represents the index of refraction of layers 54 and 56.

$$|(n1-n2)/(n1+n2)| \qquad (1)$$

Because the values of n1 and n2 differ considerably, there is a relatively large potential for the presence of indium tin oxide layer 90 to give rise to unwanted amounts of light reflection. Because the phase of reflected light 100 is 180° out of phase with the phase of reflected light 104, however, light reflection can be minimized by minimizing the thickness T of indium tin oxide layer 90. When T is relatively large, out-of-phase rays 100 and 104 do not destructively interfere, leading to relatively large amounts of reflected light. When T is relatively small, out-of-phase rays 100 and 104 tend to cancel each other, thereby minimizing reflections.

When, for example, the value of T is relatively thick (e.g., 200 angstroms or more as in conventional displays), the reflectivity of the display may be larger than desired. As an example, if T is formed with a conventional thickness of 300 angstroms, the reflectivity of the display due to the presence of the indium tin oxide electrostatic discharge shielding layer may be about 1.4%. If T is formed with a conventional thickness of 200 angstroms, the reflectivity of the display may be about 0.75%.

Modeling results and experimental results using indium tin oxide electrostatic shielding layers of less than 200 angstroms in thickness indicate that further reductions in reflections can be achieved by forming indium tin oxide electrostatic shielding layer 90 with values of thickness T that are less than 200 angstroms. As an example, if T is 100 angstroms, reflectivity may be reduced to about 0.24%.

For satisfactory electrostatic shielding, it may be desirable to ensure that T is not too thin. If T is too thin (e.g., less than 10 angstroms), the sheet resistance of layer 90 may become so large (e.g., more than 10,000 ohms per square). When T has a value that is not too small, however, sheet resistance may be maintained at a suitably low value. As an example, if the value of T is about 90 angstroms, the sheet resistance of indium tin oxide electrostatic shield layer 90 may be about 700 ohms per square. When low sheet resistances are present, shielding layer 90 may effectively discharge electrostatic charge to ground 96.

In general, the thickness T of layer 90 may be less than 200 angstroms, less than 175 angstroms, less than 150 angstroms, less than 100 angstroms, more than 50 angstroms, more than 75 angstroms, between 40-180 angstroms, 30-180 angstroms, 30-190 angstroms, 50-120 angstroms, 50-150 angstroms, 60-140 angstroms, 60-120 angstroms, 40-175 angstroms, 50-175 angstroms, 60-175 angstroms, 60-150 angstroms, 70-130 angstroms, 100-170 angstroms, or other suitable thickness. When thickness T has small values such as these, light 140 and out-of-phase light 100 tend to destructively interfere with each other, thereby reducing reflected light and minimizing the reflectivity of display 14 to ambient light so that viewer 48 can better view content on display 14.

Figure 7:
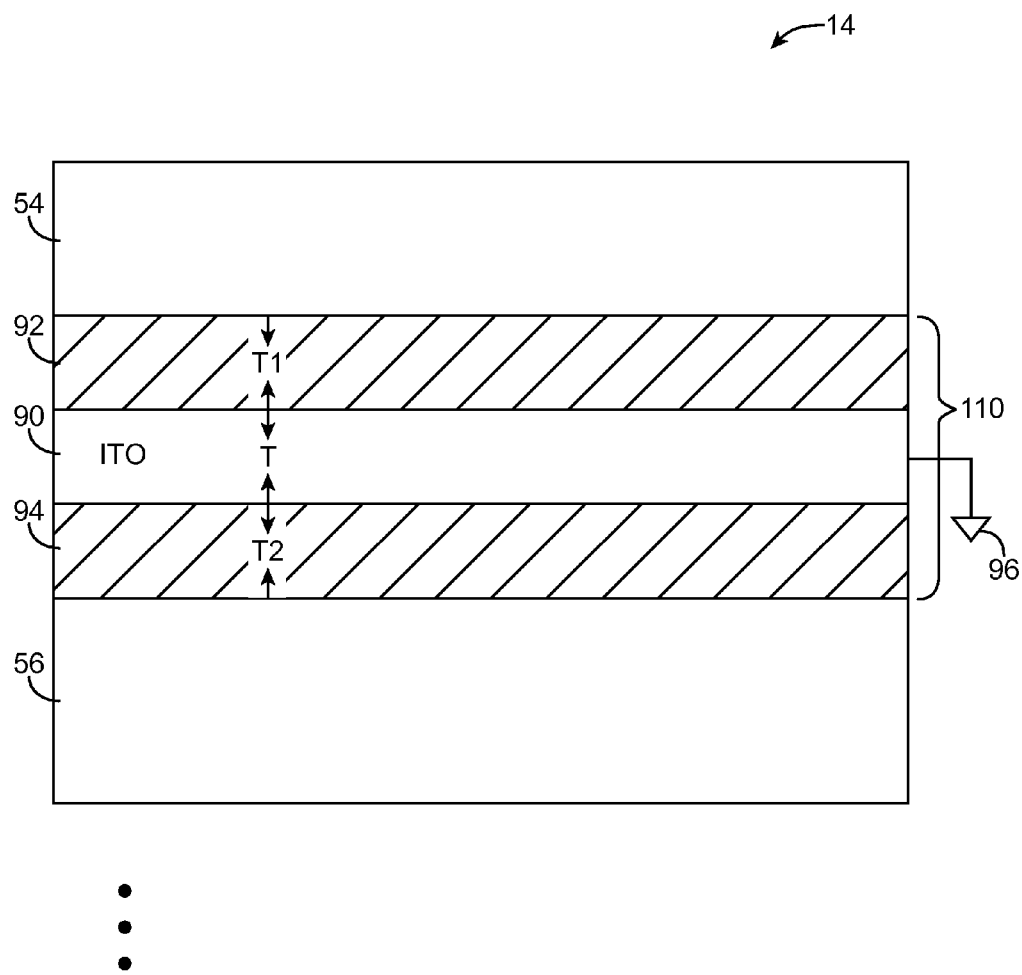
FIG. 7 is a cross-sectional side view of an illustrative display with a transparent conductive electrostatic discharge shielding layer interposed between upper and lower layers of material such as aluminum oxide to reduce surface reflections in accordance with an embodiment of the present invention.

If desired, one or more layers of transparent material may be formed adjacent to indium tin oxide electrostatic shielding layer 90 to help minimize light reflection from display 14. This type of arrangement is shown in FIG. 7. As shown in FIG. 7, display 14 may include, for example, an upper layer such as layer 92 of thickness T1 and a lower layer of material such as layer 94 of thickness T2. Layers such as upper layer 92 and lower layer 94 may be formed from transparent insulating materials (e.g., oxides, nitrides, or other dielectrics) such as aluminum oxide ($Al_2O_3$) or other transparent materials. Layers 92 and 94 may be formed by sputtering, other physical vapor deposition techniques, chemical vapor deposition, or other deposition techniques.

Layers 92 and 94 may have indices of refraction that differ from those of indium tin oxide electrostatic shielding layer 90, polarizer layer 54, and color filter glass 56. As an example, layer 92 may have an index of refraction that is intermediate between the index of refraction of layer 54 and the index of refraction of layer 90 and layer 94 may have an index of refraction that is intermediate between the index of refraction of glass layer 56 and the index of refraction of layer 90. In a scenario in which layers 54 and 56 have indices of refraction of 1.5 and layer 90 has an index of refraction of 1.9, for example, layers 92 and 94 may each of an index of refraction of 1.69 (e.g., the index of refraction of aluminum oxide). By suitable selection of the values of thicknesses T1, T, and T2, an index-matching configuration can be achieved in which layers 110 are effectively index matched to layers 54 and 56, minimizing reflections. Examples of suitable thickness values that may be used for T1, T, and T2, respectively include 1250 angstroms, 250 angstroms, and 1250 angstroms (as a first example), 1050 angstroms, 250 angstroms, and 1050 angstroms (as a second example), and 903 angstroms, 250 angstroms, and 926 angstroms (as a third example).

Configurations of the type shown in FIG. 6 in which indium tin oxide electrostatic shielding layer 90 has a small thickness may be advantageous in minimizing reflections from display 14 without introducing color casts or wavelength-dependent reflectivity. Display configurations of the type shown in FIG. 7 may be characterized by low sheet resistance for layer 90. To ensure satisfactory grounding for layer 90 in arrangements of the type shown in FIG. 7, a shadow mask may be used to prevent layer 90 from being covered by layers such as layer 92 during fabrication. After the shadow mask is removed, an electrical path may be formed between layer 90 and ground 96.

The foregoing is merely illustrative of the principles of this invention and various modifications can be made by those skilled in the art without departing from the scope and spirit of the invention.

What is claimed is:

1. A display, comprising:
a polarizer layer having a first index of refraction;
a display layer having a second index of refraction that is different from the first index of refraction;
an electrostatic shielding layer having a third index of refraction that is different from the first and second indices of refraction interposed between the polarizer layer and the display layer, wherein the electrostatic shielding layer has a thickness of 30 to 190 angstroms;
a first layer of index-matching material having a fourth index of refraction that is between the first index of refraction and the third index of refraction interposed between the polarizer layer and the electrostatic shielding layer; and
a second layer of index-matching material having a fifth index of refraction that is between the second index of refraction and the third index of refraction interposed between the electrostatic shielding layer and the display layer.

2. The display defined in claim 1 wherein the display layer comprises a color filter glass layer.

3. The display defined in claim 2 wherein the electrostatic shielding layer comprises indium tin oxide.

4. The display defined in claim 2 wherein the electrostatic shielding layer comprises indium tin oxide, wherein the display layer comprises a color filter glass layer having opposing first and second surfaces and color filter elements formed on the second surface, and wherein the indium tin oxide is deposited on the first surface.

5. The display defined in claim 4 wherein the electrostatic shielding layer has a thickness of between 60 and 120 angstroms.

6. A display, comprising:
an upper polarizer layer having a first index of refraction;
a lower polarizer layer;
a liquid crystal layer between the upper polarizer layer and the lower polarizer layer;
a color filter glass layer having a second index of refraction between the upper polarizer layer and the liquid crystal layer;
a thin-film transistor layer between the liquid crystal layer and the lower polarizer;
an electrostatic shielding layer having a third index of refraction between the color filter glass layer and the upper polarizer, wherein the electrostatic shielding layer has a thickness of between 50 and 175 angstroms;
a first layer of index-matching material having a fourth index of refraction that is greater than the first index of refraction and less than the third index of refraction interposed between the upper polarizer layer and the electrostatic shielding layer; and
a second layer of index-matching material having a fifth index of refraction that is greater than the second index of refraction and less than the third index of refraction interposed between the electrostatic shielding layer and the color filter glass layer.

7. The display defined in claim 6 wherein the electrostatic shielding layer comprises indium tin oxide.

8. The display defined in claim 6 wherein the electrostatic shielding layer has a thickness of between 50 and 120 angstroms.

9. The display defined in claim 8 wherein the electrostatic shielding layer comprises a layer of sputtered indium tin oxide on the color filter glass layer.

* * * * *